Dec. 19, 1933.  C. F. SEITER  1,939,863
BOAT TRAILER
Filed July 3, 1930  2 Sheets-Sheet 1
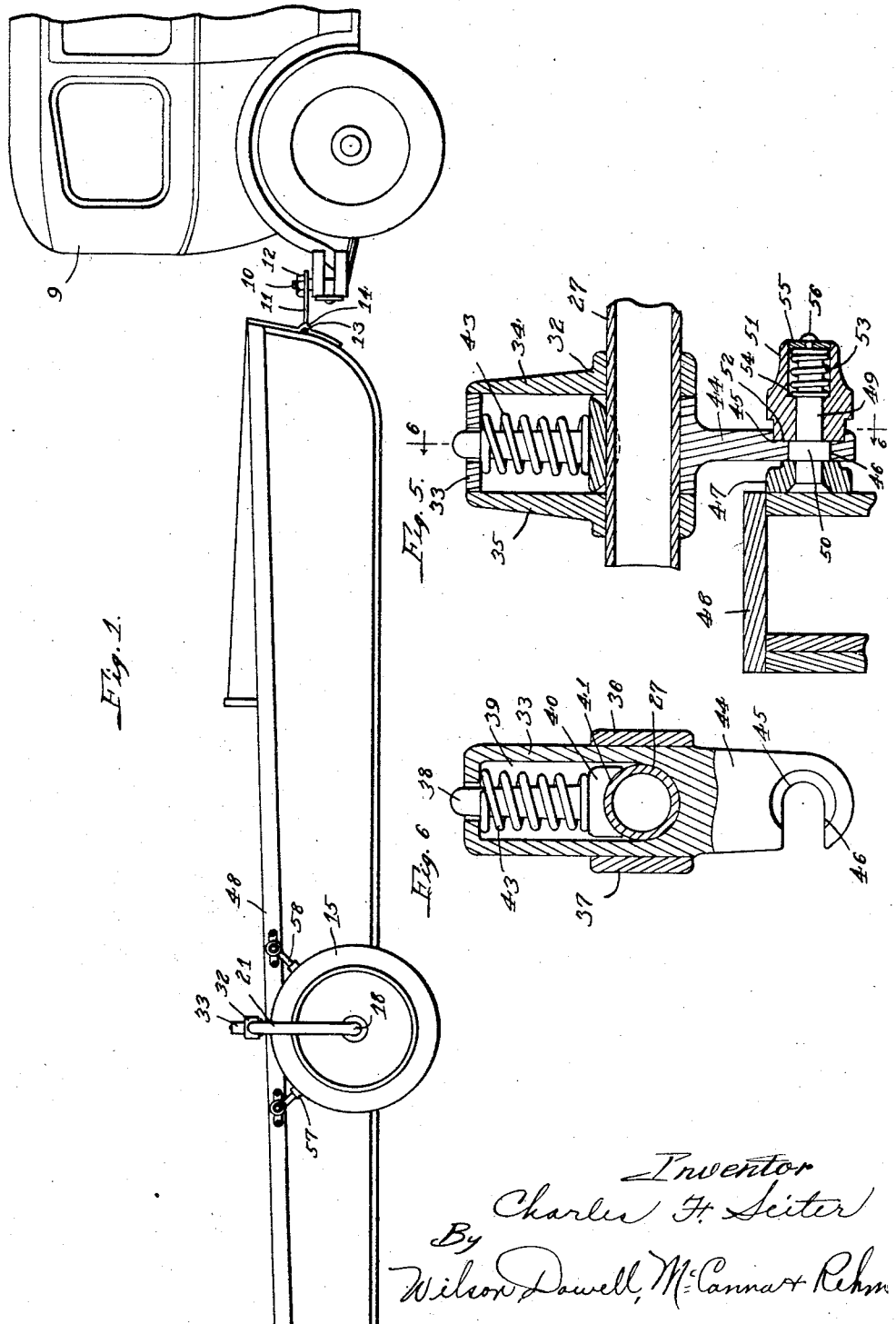
Inventor
Charles F. Seiter
By
Wilson, Dowell, McCanna & Rehm
Attys Dec. 19, 1933.　　　C. F. SEITER　　　1,939,863
BOAT TRAILER
Filed July 3, 1930　　　2 Sheets-Sheet 2
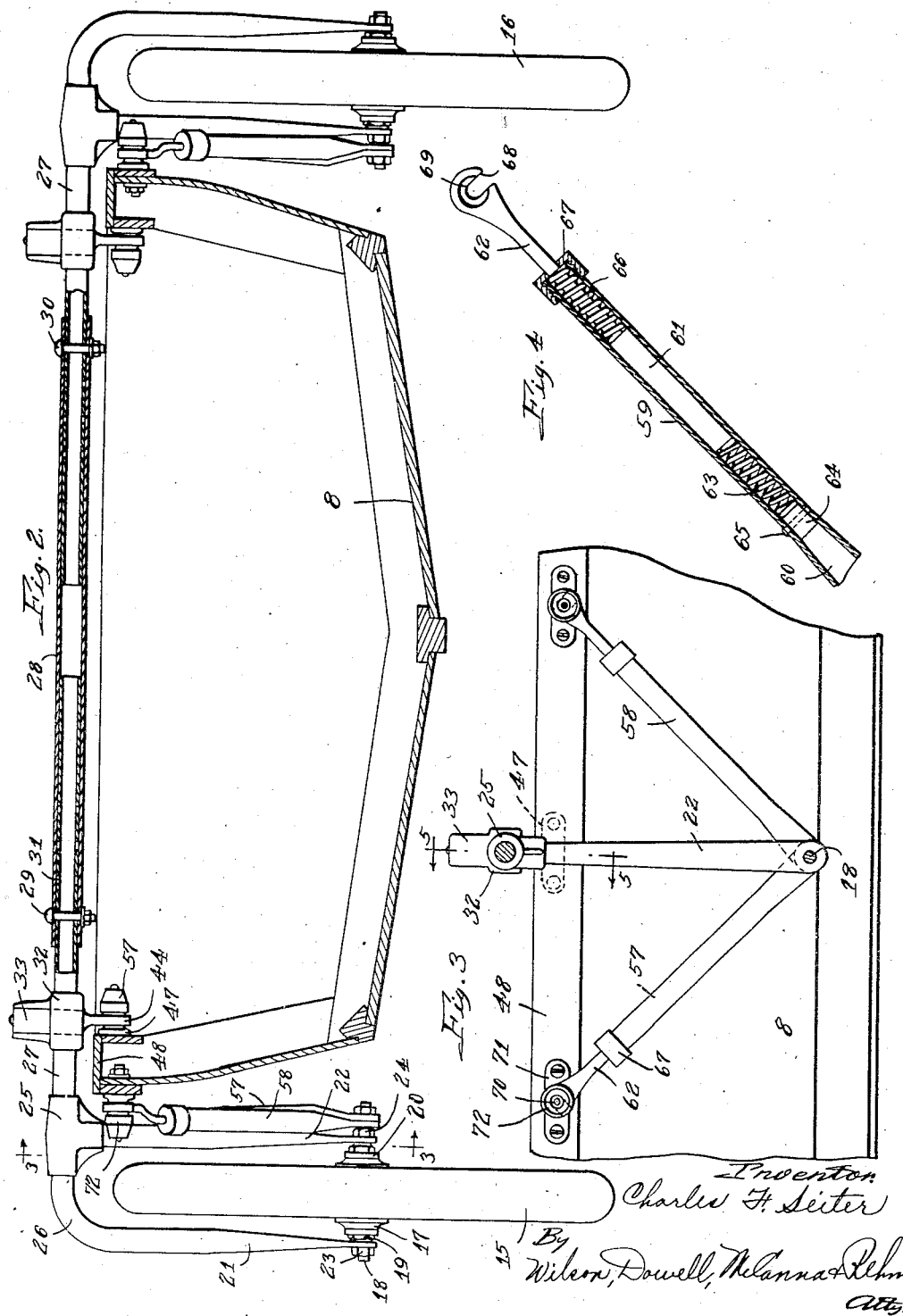

Patented Dec. 19, 1933

1,939,863

UNITED STATES PATENT OFFICE 1,939,863

BOAT TRAILER

Charles F. Seiter, Rockford, Ill.

Application July 3, 1930. Serial No. 465,488

15 Claims. (Cl. 280—80)

My invention relates to boat trailers and has particular reference to a two-wheeled trailer adapted to support a boat from points near the upper edge of the sides thereof.

In the transportation of boats upon the highways it has been customary in the past to provide a four-wheeled trailer, the boat being placed upon the frame of the trailer and secured by suitable blocks. Such a device involves a considerable outlay in money for the purchase of a trailer of this character and requires considerable labor and equipment in removing the boat from the water and placing it upon the trailer. A trailer of this size and character is necessarily heavy and cumbersome and consequently is difficult to manipulate upon the highways behind the usual type of pleasure car. Furthermore such a trailer requires considerable storage space when not in use.

Various two-wheeled trailing devices have been known but most of these have been crude in construction and the weight of the boat has not been satisfactorily sprung from the axle of the trailer.

I have, therefore, aimed to provide a boat trailer which is light in construction and consequently easily capable of being handled by the usual pleasure car.

Another object of the invention is the provision of a boat trailer from which the boat is suspended near the upper edges of the sides thereof.

A further object of the invention is the provision of a boat trailer wherein the boat is resiliently suspended.

A further object of the invention is the provision of a boat trailer which may be quickly and easily secured to and released from the boat, when the latter rests upon the surface of the water, without any necessity for the operator becoming wet during the operation.

Another object of the invention is the provision of a boat trailer which may be stored in relatively small space when not in use.

I have also aimed to provide a boat trailer which may be accommodated to boats of any size within the limits of the capacity of the trailer.

A further object of the invention is the provision of a boat trailer which may be manufactured at a substantially smaller cost than other trailers of like nature heretofore known.

Other objects and attendant advantages will become apparent to those skilled in the art from the following description and the accompanying drawings, in which—

Figure 1 is a perspective view showing the manner in which a boat embodying my improved trailer is drawn behind a vehicle;

Fig. 2 is a vertical lateral section through the boat and trailer, the trailer being partially in elevation, showing the manner in which the boat is supported upon the trailer;

Fig. 3 is a section substantially on the line 3—3 of Fig. 2;

Fig. 4 is a section through one of the thrust braces, showing the manner in which the springs are arranged therein;

Fig. 5 is an enlarged section on the line 5—5 of Fig. 3, through the spring support and bracket showing the manner in which the hooks are secured to the bracket bolt; and Fig. 6 is a section on the line 6—6 of Fig. 5, through the spring support and hook at right angles to Fig. 5.

The invention contemplates the provision of a pair of wheels having pneumatic tires such, for instance, as are customarily employed for motorcycles and the like. A fork is attached to the axle of each wheel, and in operation is arranged to extend vertically upward from the axles. A shaft connects the two forks and is provided with means for supporting a boat between the two wheels. Braces are connected to the axle of each wheel and extend from the axle to the side of the boat to brace the boat and maintain the forks in a vertical position. Means are provided for quickly attaching and detaching the boat from the trailer.

Referring now to Fig. 1, a boat, designated generally by the numeral 8, is arranged to be trailed behind a motor vehicle 9 by providing an upright bolt 10 fixedly secured to the rear bumper of the vehicle 9, or to some other convenient part of the vehicle. A bracket 11 may be secured to the bolt 10 through a nut 12 and is provided with a suitable latch or hook 13 adapted to be secured in a loop 14 attached to the prow of the boat 8. Any conventional or desired device may be employed for this purpose, it only being necessary that the device serve to support a portion of the weight of the boat, I have in this instance shown about a third of the boat being supported in this manner, and that there be a certain amount of pivotal movement permitted between the vehicle and the boat. The trailer presently to be described is, in this instance, positioned about two-thirds of the distance back from the prow of the boat.

Referring to Fig. 2, the numerals 15 and 16 designate generally a pair of wheels which may advantageously be provided with pneumatic tires.

I have found it convenient to employ for this purpose the type of wheel and tire customarily employed on motorcycles, though this is by no means necessary or essential.

Each of the wheels 15 and 16 form portions of like units arranged to be positioned on opposite sides of the boat 8 connected across the top of the boat by means presently to be described. I will therefore proceed to describe a single unit, the numerals applying to like parts on each unit.

The wheel 15 is provided with a customary hub 17 within which is supported an axle 18 through suitable bearings secured in position within the hub by caps 19 and 20 in the conventional manner. A fork is formed by pipe members 21 and 22 which are fixedly secured to the axle 18 by nuts 23 and 24 and extend vertically upward to a pipe union 25, the member 21 being bent through a right angle at 26. The member 25 may be a pipe union into which the various pipe members are threaded, or it may be shrunk onto the pipe members as desired. A pipe member 27 is fixedly secured within the pipe union 25 and projects laterally outward. The members 27 of each unit may be fixedly secured together through a sleeve 28 which passes over the pipe members 27 of each unit and has sliding engagement therewith, thus forming with the members 27, the forks, and axles 18, a connecting shaft for the wheels. Bolts and nuts 29 and 30 pass through the sleeve 28 and may be selectively positioned in any one of a series of openings 31 in the members 27 of each unit. It will be seen that in this manner the distance between the wheels 15 and 16 of each unit may be varied to suit the width of the particular boat with which the trailer is to be employed.

A spring support 32 is slidably positioned upon the pipe member 27 and is provided with a spring support block 33 shown in detail in Figs. 5 and 6. The spring support 32 is provided with upstanding end portions 34 and 35 arranged to closely fit the pipe member 27 and prevent lateral movement of the block 33 therein, and with side portions 36 and 37 spaced from the pipe member 27 to receive the block 33 and prevent longitudinal movement thereof. The block 33 has, however, vertical movement between the pipe member 27 and the side members 36 and 37. A pin 38 is positioned within an opening 39 and is provided with a shoulder 40 having an arcuate lower surface 41 in contact with the pipe member 27 which passes through the opening 39 in the block 33. A spring 43 rests about the pin 38, one end of the spring 43 abutting against the shoulder 40 and the opposite end thereof abutting against the upper end of the block 33. A hook 44, from which the boat is suspended, is formed integral with the block 33 at the lower end thereof and is provided with a circular depression 45 and a slot 46.

Means are provided for securing the hook 44 to the boat 8 through a bracket 47 attached to the inner side of the gunwale 48 of the boat 8. The bracket may be attached to the boat by means of screws, bolts or other suitable means. A bolt 49 having an annular shoulder 50 is secured in the bracket 47 and extends outward therefrom, as shown in Fig. 5, the annular shoulder 50 being of such size as to be receivable within the slot 46 of the hook 44 when the spring support 32 is suitably rotated. A spring nut 51 surrounds the outer end of the bolt 49 and is provided with an inner shoulder 53 closely receivable within the circular depression 45 of the hook 44 to prevent the bolt 49 from being accidentally dislodged from the slot 46. The nut 51 is held upon the bolt 49 by a spring 53 which is interposed between the nut and bolt and abuts against a shoulder 54 on the nut 51. The outer end of the spring 53 abuts against a plate 55 secured to the end of the bolt 49 by means of a screw 56.

It will thus be seen that the hook 44 may be caused to engage the bolt 49 by drawing the nut 51 to the right facing Fig. 5 and rotating the spring support 32 until the slot 46 receives the annular shoulder 50. The spring support 32 may be moved laterally along the pipe portion 27 in order to bring the slot 46 and the annular shoulder 50 into coincidence. The nut 51 may then be released, whereby the shoulder 52 thereof will pass into the circular depression 45 in which position the bolt 49 is prevented from moving out of the slot 46. In this manner the spring support 32 on each of the units is caused to support the boat from the inner side of the gunwale of each side of the boat.

In order to maintain the forks in a vertical position and brace the boat with respect to the trailer two thrust braces, designated generally by 57 and 58, are employed in each unit, as shown in Figs. 2 and 3. The lower ends of these braces are supported upon the axle 18 and extend upward therefrom at an angle with respect to each other to the outer side of the boat gunwale, as shown in Fig. 3. Referring to Fig. 4, the braces each consist of a tubular portion 59, the lower end 60 of which is secured to the axle 18. A plunger 61 having a plunger rod 62 attached to the upper end thereof and extending out of the tubular portion 59, is interposed within the tubular portion 59. A spring 63 at the lower end of the plunger 61 abuts against a block 64 interposed in the tubular portion 59 and secured therein by means of a bolt 65. A coil spring 66 abuts against the plunger 61 and against a top 67 having threaded engagement with the upper end of the tubular portion 59. Through this arrangement relative movement of the plunger rod 62 with respect to the tubular portion 59 will cause the plunger 61 to move either upward or downward within the tubular portion 59 against the action of either spring 63 or 66 which will offer resistance to the movement of the plunger and thus cushion such movement. An upper end of the rod 62 is provided with a slot 68 and a circular depression 69 similar to the slot 46 and the depression 45 in the hook 44 of the spring support 32. The slot 68 and the depression 69 on the end of each of the brackets 57 and 58 engage bolts 70 on brackets 71 secured to the gunwale 48, identical in every respect with the bolt 49 and the bracket 47 on the inner side of the gunwale. The nuts 72, identical with the nut 51, serve to maintain the bolts 70 within the slot 68 in a manner already set forth. It will thus be seen that should an impact against the forward edge of the wheel 15, viewing Fig. 1, tend to move the wheel upward and backward the rod 62 will be forced into the tubular portion 59 of the bracket 57 compressing the spring 63. At the same time the rod 62 will be drawn out of the tubular portion 59 of the bracket 58 thus compressing the spring 66 and vice versa. In this manner the usual road impacts are cushioned.

The trailer is particularly cheap to manufacture and efficient in operation. Assuming that the boat has been in use and rests upon the surface of the water, the trailer may be run into the water, with the wheels 15 and 16 on opposite sides of the boat, until the pipe portions 27 rest above the brackets 47 on each gunwale. The nuts 51 may then be drawn outward and the hooks 44 secured to the bolts 49 in the manner described. In like manner the braces 57 and 58 may be secured to the bolts 70. When this has been accomplished the boat may be drawn from the water by any suitable method on the wheels 15 and 16. Thus the trailer may be secured to the boat from the inside thereof whereby it is unnecessary for the operator to get into the water at any time during the operation.

Because of the resilient manner in which the boat is supported and braced it may be drawn along behind a vehicle at a rapid rate of speed without detriment thereto or to the pavement upon which it is being drawn.

The design of the trailer is such that it may be accommodated to boats of a wide variety of sizes. The pipe portions 27 may be drawn out of the sleeve 28 whereby boats of considerable width may be supported between the wheels 15 and 16. On the other hand the pipe portions may be moved into the sleeve 28 so that boats of comparatively small width may be supported thereon.

The spring supports 32 are slidable on the pipe portions 27 so that boats having considerable variation in the width of the gunwale may be supported between each set of braces 57 and 58 and each of the spring supports 32.

Because of the simple and efficient means for connecting the spring supports 32 with the bolts 49 and the braces 57 and 58 with the bolts 7, the trailer may be attached and detached from the boat with a minimum of time and effort, though the boat is securely held thereby.

The design of the trailer is such that it may be stored in a minimum amount of space when not in use. The sleeve 28 may be detached from the pipe portions 27, thereby separating the two units of the trailer and permitting them to be placed one upon the other and stacked in a comparatively small space. They may, for example, in this manner be placed in the rear seat of an ordinary two-seated pleasure vehicle.

While I have thus described and illustrated a specific embodiment of my invention I am aware that numerous alterations and changes may be made therein without materially departing from the spirit of the invention and I do not wish to be limited except as required by the prior art and the scope of the appended claims, in which—

I claim:

1. A boat trailer comprising, in combination, means for pivotally connecting the prow of a boat to a vehicle adapted to normally partially support said boat, a wheel positioned at each side of said boat, a shaft above said boat connecting said wheels and interlocking devices arranged on said shaft and the sides of said boat to support said boat from said shaft, whereby it may be trailed behind a vehicle.

2. The combination in a boat trailing device of wheels on each side of said boat, each provided with an axle, forks supported on said axles, a shaft connecting said forks and extending across said boat, means for adjusting the length of said shaft to accommodate boats of different widths, and means for resiliently supporting said boat from said shaft whereby the same may be trailed behind a vehicle.

3. The combination in a boat trailing device of wheels on each side of said boat, each provided with an axle, forks supported on said axles, a shaft connecting said forks and extending across said boat, means for adjusting the length of said shaft to accommodate boats of different widths, means for resiliently supporting said boat from said shaft, and resilient means for maintaining said forks in an upright position, whereby said boat may be trailed behind a vehicle.

4. In a boat trailing device having a pair of wheels and a shaft therebetween, a spring support for said boat having a block provided with an opening to receive said shaft, a hook secured to said boat, and spring means in said opening, acting between said block and said shaft, to permit abrupt upward movement of said shaft to be absorbed by said spring whereby the shocks of the road are cushioned.

5. In a boat trailing device having a pair of wheels and a shaft therebetween, means for resiliently supporting said boat including spring supports having blocks provided with openings to receive said shaft, hooks on said blocks secured to the inner side of opposite gunwales of said boat, and spring means in said openings acting between said blocks and said shaft to permit abrupt upward movement of said shaft to be absorbed by said spring, and a pair of resilient thrust braces secured to each wheel and to opposite gunwales of said boat, one of each pair being secured thereto forward of said hook and one rearwardly of said hook to resiliently brace said boat, said spring supports and said thrust braces serving to absorb the shocks of the road.

6. A boat trailer comprising, in combination, means for pivotally connecting the end of a boat to a vehicle adapted to tow said boat, a wheel positioned at each side of said boat, and resilient means for supporting said boat upon said wheels including a pair of diagonally positioned thrust braces on each side of said boat having a movable member provided with cushioned motion in both directions from a central point.

7. A boat trailer comprising, in combination, means for pivotally connecting the end of a boat to a vehicle adapted to partially support said boat, a wheel positioned at each side of said boat, a shaft above said boat connecting said vehicle, resilient means for supporting said boat from said shaft, and at least one diagonal thrust brace on each side of said boat acting between said wheel and said boat, having a longitudinally movable member provided with cushioned motion in both directions from a central point.

8. A boat trailer comprising, in combination, means for pivotally connecting the end of a boat to a vehicle adapted to tow the same, a wheel positioned at each side of said boat, and quick detachable means for securing said boat to said shaft including a rotatable hook on said shaft having a slot and a depression, a bolt on said boat adapted to be received in said slot, a nut on said bolt movable longitudinally thereof into and out of said depression, and spring means for normally maintaining said nut in said depression to prevent said hook from disengaging said bolt.

9. A boat trailer adapted to be lowered over a boat while on the surface of the water for removing and trailing the same comprising a pair of spaced wheels, a connecting shaft arranged to extend over said boat, and resilient connectors between the shaft and opposite sides of the boat for hanging the boat therefrom.

10. A boat trailer adapted to be lowered over a boat while on the surface of the water for removing and trailing the same comprising a pair of spaced wheels, connecting means between the two wheels extending vertically along the sides of the boat and transversely across the top thereof, resilient means for connecting opposite sides of the boat directly to the transverse portion of said connecting means, and resilient means acting between the vertical portions of said connecting means and the sides of said boat to maintain said vertical portions upright.

11. A boat trailer comprising a pair of wheel units for attachment to opposite sides of a boat to be trailed, each unit having a wheel, wheel carrying means having a portion extending upward along the side of the boat and a horizontal portion, resilient means for connecting the side of the boat with said wheel carrying means, and means for maintaining said wheel carrying means in an upright position.

12. A boat trailer comprising a pair of wheel units for attachment to opposite sides of a boat to be trailed, each unit having a wheel, wheel carrying means having a portion extending upward along the side of the boat and a horizontal portion, resilient means for connecting the side of the boat with said wheel carrying means, means for maintaining said wheel carrying means in an upright position, and means for connecting the horizontal portions of the two units.

13. A boat trailer comprising a pair of wheel units for attachment to opposite sides of a boat to be trailed, said units being separable for transportation, each unit having a wheel, wheel carrying means having a portion extending upward along the side of the boat and a horizontal portion, resilient means for connecting the side of the boat with said wheel carrying means, means for maintaining said wheel carrying means in an upright position, means for connecting the horizontal portions of said units, and means for varying the distance between said units.

14. A boat trailer comprising means for connecting the prow of a boat to a vehicle for trailing the same, a pair of wheel units for attachment to opposite sides of a boat to be trailed at points such as to normally throw a portion of the weight onto said vehicle, each unit having a wheel, wheel carrying means having a portion extending upward along the side of the boat and a horizontal portion, resilient means for connecting the side of the boat with said wheel carrying means, and means for maintaining said wheel carrying means in an upright position.

15. A boat trailer comprising, in combination, means for pivotally connecting the end of a boat to a vehicle adapted to partially support said boat, a wheel positioned at each side of said boat, and resilient means for supporting said boat upon said wheels including thrust braces having longitudinally movable members provided with cushioned motion in both directions from a central point.

CHARLES F. SEITER.